United States Patent
Bellman et al.

(10) Patent No.: US 12,323,454 B2
(45) Date of Patent: Jun. 3, 2025

(54) FRAUD NETWORKS

(71) Applicant: Early Warning Services, LLC, Scottsdale, AZ (US)

(72) Inventors: Jacob M. Bellman, Fairfield, OH (US); Dan M. Hayden, Mesa, AZ (US); Abhishek Chambe Venkatesh Murthy, Chicago, IL (US); John M. Kohoutek, Chicago, IL (US); Klementina Nikov, Des Plaines, IL (US)

(73) Assignee: Early Warning Services, LLC, Scottsdale, AZ (US)

( * ) Notice: Subject to any disclaimer, the term of this patent is extended or adjusted under 35 U.S.C. 154(b) by 258 days.

(21) Appl. No.: 18/100,982

(22) Filed: Jan. 24, 2023

(65) Prior Publication Data

US 2023/0164169 A1    May 25, 2023

Related U.S. Application Data

(63) Continuation-in-part of application No. 17/824,688, filed on May 25, 2022.

(60) Provisional application No. 63/302,926, filed on Jan. 25, 2022, provisional application No. 63/192,979, filed on May 25, 2021.

(51) Int. Cl.
 H04L 29/06 (2006.01)
 H04L 9/40 (2022.01)
 H04L 41/16 (2022.01)

(52) U.S. Cl.
 CPC .......... H04L 63/1433 (2013.01); H04L 41/16 (2013.01)

(58) Field of Classification Search
 CPC ..... H04L 63/1433; H04L 63/20; H04L 63/10; H04L 63/145; H04L 63/126; H04L 63/0263
 See application file for complete search history.

(56) References Cited

U.S. PATENT DOCUMENTS

| | | | |
|---|---|---|---|
| 9,185,095 B1 * | 11/2015 | Moritz | H04L 63/0861 |
| 11,706,213 B2 * | 7/2023 | Cao | G06Q 20/40145 726/4 |
| 12,131,337 B2 * | 10/2024 | Lagneaux | H04L 63/08 |
| 2020/0302446 A1 | 9/2020 | Kledaras et al. | |
| 2022/0383323 A1 | 12/2022 | Burke et al. | |

\* cited by examiner

*Primary Examiner* — Longbit Chai
(74) *Attorney, Agent, or Firm* — Kilpatrick Townsend & Stockton LLP (57) ABSTRACT

A method of determining a fraud network comprising: receiving address information regarding a first address; determining, using an address risk machine learning model, a first address risk score associated with the first address; identifying a first entity associated with the first address based on the first address risk score; determining at least one of a second address and a second entity associated with the first entity; and generating a fraud network profile including the first address, and the at least one of the second address and second entity.

20 Claims, 5 Drawing Sheets

FRAUD NETWORKS

CROSS REFERENCE

This application claims benefit of U.S. Provisional Application No. 63/302,926 by Bellman et al., entitled "PUSH NOTIFICATIONS AND ADDRESS RISKING," filed Jan. 25, 2022, the disclosure of which is incorporated by reference herein its entirety.

This application is a continuation-in-part of U.S. patent application Ser. No. 17/824,688 by Burke et al., published as U.S. Patent Application Publication No. 2022/0383323 A1, entitled "FRAUD DETECTION SYSTEMS AND METHODS," filed May 25, 2022, which claims the benefit of U.S. Provisional Application No. 63/192,979 by Burket et al., entitled "FRAUD DETECTION SYSTEMS AND METHODS," filed May 25, 2021, the disclosure of which is incorporated by reference herein its entirety.

BACKGROUND OF THE INVENTION

Historically, fraud detection has involved determining risk associated with incomplete information. For example, a first entity (e.g., an individual or consumer) can perform an interaction with a second entity (e.g., a business or other suitable provider of goods or services). A determination of risk associated with the interaction can be made using some information, such as name and phone number, about the first entity. But, the determination of risk historically does not use comprehensive information and may not produce an adequate risk score (e.g., the risk score may not be accurate since some information, such as address, is missing). Thus, there is a need for an improved determination of risk, using more complete information, associated with one or more interactions.

Historically, notifications associated with interactions have been limited. For example, the notifications have been limited to interaction confirmations, interaction errors, and other simple notifications. The simple notifications may not inform one or more entities involved in an interaction of one or more pieces of important information relevant to the interaction. For example, the simple notifications may not include any notifications relating to fraud, completion, safety, or other relevant information. Thus, there is a need for improved notifications associated with one or more interactions between the entities.

BRIEF SUMMARY OF THE INVENTION

One aspect of the disclosure provides for a method of determining a fraud network using one or more processors, comprising: receiving address information regarding a first address; determining, using an address risk machine learning model, a first address risk score associated with the first address; identifying a first entity associated with the first address based on the first address risk score; determining at least one of a second address and a second entity associated with the first entity; and generating a fraud network profile including the first address, and the at least one of the second address and second entity. The method may further comprise transmitting a notification to a user device involved in an interaction with at least one of an entity or address of the fraud network profile. Identifying the first entity may be based on the first address risk score being greater than a threshold value. Determining at least one of the second address and second entity may comprise determining the second address is associated with the first entity. The method may further comprise determining, using the address risk machine learning model, a second address risk score associated with the second address. Generating the fraud network profile may comprise incorporating the second address based on the second address risk being greater than the threshold value. The method may further comprise: iteratively identifying further entities or addresses associated with the at least one of the entity or address of the fraud network profile; and incorporating the further entities or addresses into the fraud network profile. Iteratively identifying the further entities or addresses may comprise iteratively identifying the further entities or addresses until there are no more unidentified entities or addresses associated with the at least one of the entity or address of the fraud network profile. Iteratively identifying further entities or addresses may comprise identifying further addresses associated with the at least one of the entity or address of the fraud network profile and incorporating the further addresses into the fraud network profile is based on a corresponding address risk score of the further addresses being greater than the threshold value. The method may further comprise determining, using an entity risk machine learning model, an entity score of the second entity greater than an entity risk score. Generating the fraud network may comprise generating the fraud network to include the second entity. The method may further comprise training the address risk machine learning model capable of predicting a risk of fraud for an address by determining relationships among labeled data.

Another aspect of the disclosure provides for a system for determining a fraud network, comprising: one or more processors; and a memory having stored thereon instructions that, upon execution by the one or more processors, cause the one or more processors to: receiving address information regarding a first address; determining, using an address risk machine learning model, a first address risk score associated with the first address; identifying a first entity associated with the first address based on the first address risk score; determining at least one of a second address and a second entity associated with the first entity; and generating a fraud network profile including the first address, and the at least one of the second address and second entity. Identifying the first entity may be based on the first address risk score being greater than a threshold value. Determining at least one of the second address and second entity may comprise determining the second address is associated with the first entity. The method may further comprise determining, using the address risk machine learning model, a second address risk score associated with the second address. Generating the fraud network profile may comprise incorporating the second address based on the second address risk being greater than the threshold value. The system may further comprise: iteratively identifying further entities or addresses associated with the at least one of the entity or address of the fraud network profile; and incorporating the further entities or addresses into the fraud network profile. Iteratively identifying the further entities or addresses may comprise iteratively identifying the further entities or addresses until there are no more unidentified entities or addresses associated with the at least one of the entity or address of the fraud network profile. Iteratively identifying further entities or addresses may comprise identifying further addresses associated with the at least one of the entity or address of the fraud network profile and incorporating the further addresses into the fraud network profile is based on a corresponding address risk score of the further addresses being greater than the threshold value. The system may further comprise training the address risk machine learning model capable of predicting a risk of fraud for an address by determining relationships among labeled data.

Another aspect provides for a non-transitory computing-device readable storage medium on which computing-device readable instructions of a program are stored, the instructions, when executed by one or more computing devices, causing the one or more computing devices to perform a method, comprising: receiving address information regarding a first address; determining, using an address risk machine learning model, a first address risk score associated with the first address; identifying a first entity associated with the first address based on the first address risk score; determining at least one of a second address and a second entity associated with the first entity; and generating a fraud network profile including the first address, and the at least one of the second address and second entity. The computing-device readable storage medium may further comprise transmitting a notification to a user device involved in an interaction with at least one of an entity or address of the fraud network profile. The method may further comprise determining, using an entity risk machine learning model, an entity score of the second entity greater than an entity risk score. Generating the fraud network comprises generating the fraud network to include the second entity. The computing-device readable storage medium may further comprise training the address risk machine learning model capable of predicting a risk of fraud for an address by determining relationships among labeled data.

DETAILED DESCRIPTION OF THE INVENTION

I. Determining a Risk of Fraud Associated with an Address

Embodiments of the present invention are directed to techniques for determining an address risk score based on an address of an entity involved in an interaction. The interaction can include a financial transaction, a data-transfer transaction, or any other suitable type of interaction between entities (e.g., any transaction or contract between a consumer and a provider of goods or services, between two or more consumers, etc.). A computer system (e.g., a computing device, a server device, a server farm, a network of computing devices, or the like as further described below), as discussed further below in FIG. 5, can determine the address risk score and may use the address risk score as part of a fraud risk determination. Fraud may include any crime related to the theft of money, goods, personal identity, scamming, or money mule crimes. The address may include a physical address (e.g., a residential address, a business address, a P.O. box, and the like) that may be associated with an entity, which can be an individual, business, or other suitable type of entity.

In some embodiments, the computer system can receive labeled data that includes address information and labels corresponding to the addresses. The data may include personally identifiable information (PII) of entities associated with the address. PII data can include address information, names, birth dates, social security numbers, income levels of each person at the address, occupations, household size, history of interactions (e.g., number of interactions in the past week, year, etc.), or the like. Further, information regarding the interaction with the address can be used (e.g., the date, time, parties, amount of money involved in the interaction, location, or the like). Where an address is associated with a business or a corporate entity, PII may additionally include information regarding that business or corporation (e.g., a company's principal place of business, corporate officers, state of incorporation, or the like). Addresses can be standardized by the computer system for accommodating slight variations between addresses. As an example, abbreviations may be standardized and/or expanded such that different formats for the same address may be identified and grouped together. In other embodiments, at least a portion of the labeled data may originate from an initial interaction with an entity. For example, the entity may initiate an interaction and provide an address for use with the interaction.

The computer system may standardize the PII for analysis. For example, where the PII includes a name, the name may be broken down into tokens and non-letter characters may be removed. For each name component (e.g., prefix, given name, family name, suffix, etc.) a lookup may be performed to identify if there are one or more standard forms of the given name component. The lookup may return the original name components, any standardized components (linked by original component), abbreviated forms of any names (de-duplicated), encoded forms of names (de-duplicated), concatenated forms of the original name components (e.g., the name of the particular person as provided in the inquiry), a gender estimation based on the original components provided, and/or other information.

Based on such matching techniques, each retrieved name may be scored based on how closely it matches a name included in identification information associated with the inquiry. In some embodiments, each name component may be scored individually, with the individual component scores being combined to generate a match score. Once the account score is generated for each result of the candidate search, the overall scores may be compared to a cutoff threshold score to identify matches that are highly likely to belong to the person associated with the inquiry. A similar process may be performed for address or other PII. More discussion regarding standardizing PII may be found in U.S. patent application Ser. No. 17/842,598 by Hayden et al, entitled "SYSTEMS AND METHODS FOR SYNTHETIC IDENTITY DETECTION," filed Jun. 16, 2022, the disclosure of which is incorporated by reference herein its entirety.

In some embodiments, the labels may include historical data associated with an address. For example, such historical data may include previous instances of flagged or fraudulent behavior corresponding to the address. Flagged behavior may be behavior that is indicative of fraud. Fraudulent behavior may be behavior that is confirmed to be fraudulent.

Examples of historical fraudulent behavior may include: causing or being involved in prior fraud; and causing or being involved in loss. In other embodiments, the labels may specify the type of fraud (e.g., first party fraud, third party fraud, scams, money mule activity, money laundering, etc.).

Examples of flagged behavior may include one or more of a history of: excess number of entities claiming to be at a certain address (e.g., a number of entities greater than a certain threshold value, such as over 200 entities); entities at this address writing checks that return; entities at this address depositing counterfeit checks; accounts (e.g., bank or other financial accounts) at this address being forced to shut down by a bank; a sudden ending of payroll checks for an entity associated with the address; how much PII is associated with the address (e.g., whether there is a large record of different types of PII or only the bare minimum, such as only a name of an entity); how often fraud or suspected fraud have been committed by an entity using the address; when the last time (date/year) fraud or suspected fraud was committed by an entity using and/or associated with the address; how many different entities have historically used the address to commit fraud or suspected fraud; how many different accounts have historically used the address to commit fraud or suspected fraud; whether the address is associated with a fraud network; the input speed, consistency, and variety (e.g., from a keyboard) for completing the interaction involved with the address (e.g., a higher input speed and consistency, and lower input variety, may imply that a robot is completing the transaction); and multiple bank accounts being opened at this address across multiple banks The historical data may additionally include data associated with good (or non-fraudulent) behavior. Examples of non-fraudulent behavior may include: entities at this address having a credit score higher than a minimum threshold credit score; entities at this address consistently making timely payments toward their outstanding bills; the number of years an address has been free of flagged or fraudulent behavior; and the income of the entities associated with this address.

Such data may originate from one or more databases in communication with or within the computer system. One example database may include a housing database including PII and other identifying information related to an address. Another example database may include a public database, such as a criminal database including crimes (e.g., fraudulent crimes) or a legal database including lawsuits related to the address. Another example database may include a financial database (e.g., from a financial institution, such as a bank or the like) including financial information regarding the address (e.g., related to the written checks and income of the address).

In some embodiments, the computer system may further label the labeled data based on the historical data. For example, the computer system may label an address in the labeled data with labels corresponding to the number of instances of flagged behavior corresponding to that address. The computer system may label the address with a label ("none") denoting that this address does not have any flagged behavior associated with it. In other embodiments, the computer system may label the address with a label ("medium") denoting that this address has some flagged behavior associated with it (e.g., higher than a first threshold amount of flagged behavior but lower than a second threshold amount). The computer system may additionally label the address with a label ("high") to denote that this address has a high number of flagged behaviors associated with it (e.g., higher than the second threshold amount).

Various models may be trained for use in the present disclosure to determine a risk of fraud using the labeled data. For example, a computer system may aggregate input data (e.g., flagged and/or non-fraudulent behavior) and output data (e.g., fraudulent behavior), and train (e.g., using unsupervised learning, supervised learning, reinforcement learning techniques and/or other statistical techniques) to derive relationships between the input and output data. These relationships may be represented in a model that predicts an outcome (e.g., a risk of fraud) based on a given input data. The model may additionally be trained using machine learning techniques, such as hidden Markov models, convolutional neural networks, polynomial regressions, and cluster analysis.

Training the address risk model may include using a variety of different optimization techniques to optimize a loss function so that the address risk model output closely tracks the actual fraudulent behavior of the training set. Such optimization techniques can include gradient descent, backpropagation, conjugate gradient, other gradient techniques, or hessian techniques, such as Newton methods. The loss function can be a difference of one or more of the actual measured fraudulent behavior and the predicted risk of fraud at one or more points in time.

Using one or more of the various training methods above, an address risk machine learning model (or "address risk model") may be trained to provide a weight for each type of flagged and non-fraudulent behavior corresponding to how likely those type(s) are associated with fraudulent behavior. For example, the address risk model may be trained to recognize that an address associated with people that deposit counterfeit checks are more likely to be associated with fraudulent behavior than an address associated with a sudden ending of payroll checks. Accordingly, the address risk model may assign a greater weight to the flagged behavior of being associated with people that deposit counterfeit checks (e.g., a weight of 0.4) compared to the flagged behavior of a sudden ending of payroll checks (e.g., a weight of 0.1). In another example, the address risk model may be trained to recognize that an address associated with the non-fraudulent behavior of people having a good credit score is less likely to be associated with fraud than an address associated with the non-fraudulent behavior of the income of the people associated with the address (e.g., where a high income may more likely indicate that the address is not associated with fraudulent behavior, such as an income higher than a certain threshold value). In this example, the non-fraudulent behavior of people having a good credit score may be assigned a greater weight (e.g., a weight of 0.6) than a weight for the non-fraudulent behavior of having a certain amount of income (e.g., a weight of 0.2).

The address risk model may be trained to assign varying weights for each type of flagged and/or non-fraudulent behavior depending on which types of flagged and non-fraudulent behavior are present for an address. For example, as noted above, the flagged behavior for an address including people associated with depositing counterfeit checks may be assigned a weight of 0.4 and a sudden ending of payroll checks may be assigned a weight of 0.1. However, where an address only has the flagged behavior of people associated with depositing counterfeit checks, this type of flagged behavior may have a weight of 0.8.

Further, the address risk model may be trained to assign varying weights for each type of flagged and/or non-fraudulent behavior depending on the number of instances of each type of behavior that are present at an address. For example, where there is a singular instance of flagged behavior of people associated with depositing counterfeit checks, this type of flagged behavior may have a weight of 0.8. However, where there are more instances of this type of behavior, the weight may increase (e.g., a weight of 0.9 for two instances of this type of flagged behavior).

The computer system may determine the risk of fraud as an address risk score. This score may be numerical or textual (as discussed further below). A numeral score may, further, be a confidence value. In determining the risk of fraud as a confidence value (e.g., as a percentage of the likelihood of fraud), the address risk model may multiply the number of instances of the flagged and/or non-fraudulent behavior with the associated weight and sum up the values to provide a decimal, which may be multiplied by 100 to determine a percentage. The flagged behavior may be represented as positive values and the non-fraudulent behavior may be represented as negative values, although other value schemes (including the opposite) may be utilized in various embodiments. As such, the model may determine the risk as follows: ((number of instances of first flagged behavior×weight)+(number of instances of first non-fraudulent behavior×weight)+(number of instances of $n^{th}$ flagged behavior×weight)+(number of instances of $n^{th}$ non-fraudulent behavior×weight))×100. Should the model return a negative value, the model may be instructed to interpret that value as indicating there is no (or minimal) risk of fraud.

For example, an address may include the flagged behavior for an address including one instance of being associated with people depositing counterfeit checks and one instance of a person having an income higher than a threshold value. Further, this type of flagged behavior may have a weight of 0.32 and this type of non-fraudulent behavior may have a weight of 0.14 where only two types of flagged and non-fraudulent behaviors are associated with the address and there are only one of each of these types of behaviors associated with the address. In this example, the risk may be determined as: ((1×0.32)+(−1×0.14))*100. Accordingly, the address risk model may determine that an address has an 18% risk of fraud. However, in other embodiments, the risk may not be provided as a percentage and may simply be provided as a decimal value (e.g., without multiplying by 100).

After tagging or scoring addresses with fraudulent attributes, numerous features can be built on each address to build-up the address risk score. The address risk score can be tested for predicting fraudulent activity by comparing the predicted risk of fraud with the historical data of fraud. For example, continuing with the previous example, the historical data may indicate that 22% of addresses are associated with fraud given the number and type of flagged and non-fraudulent behavior. Accordingly, the address risk model may continue to be trained, using the techniques noted above, to derive weight values for each type of behavior to minimize the difference between the predicted risk of fraud and historical data of fraud. In some embodiments, testing the address risk score can include comparing real world data with the outputs of the address risk score. Testing can be performed at regular intervals (e.g., daily, weekly, monthly, yearly, etc.) or randomly. Standard validation metrics (e.g., area under the curve analysis, Kolmogorov-Smirnov test, information value analysis, false positive ratios, etc.) can be used to regularly assess the predictive power of the address risk score. In other embodiments, as will be discussed below, the computer system may identify network connections between fraudsters (as discussed further below).

In some examples, a first copy of the address risk model may be provided for use with data being received in real-time to provide a real-time risk of fraud. Meanwhile, a second copy of the address risk model may be further trained until, at a later date, the first copy is updated to include the values of the second address risk model. However, in other embodiments, an address risk model may be trained in real-time such that data of flagged, non-fraudulent, and fraudulent behavior may train the address risk model as such data is received.

The computer system may assign an address with a "low," "medium," or "high" risk score based on the percentage chance of fraud from the model. For example, an address having: a low chance of fraud may include a 0-10% of fraud; a medium chance of fraud may include 11-60% chance of fraud; and a high chance of fraud may include 61-99% (or higher) chance of fraud. Other percentage values for each category are envisioned. In other embodiments, other types of scores may be assigned to each address to indicate the likelihood that an address is associated with fraudulent behavior.

Determining the risk of fraud using addresses may be beneficial over other means of determining fraud because addresses information is more likely to be required in transactions and, therefore, more easily noted as being associated with entities that commit fraudulent behavior. Moreover, information regarding addresses are more readily available and recorded, thus allowing for a more detailed picture of what entity and what activity may be associated with a given address than by focusing on other aspects of fraud detection.

Although the above address risk model is directed to determining a risk of fraud for an address, in other embodiments, an entity risk machine learning model (or "entity risk model") may be trained to determine a risk of fraud for a given entity (e.g., an individual, or corporate or business entity). Using similar techniques as described above, the entity risk model may determine a risk that an entity is a fraudster based on one or more of the flagged, non-fraudulent, and fraudulent behavior associated with the entity (rather than with an address, as discussed above).

In some embodiments, where the address and/or entity risk model determines that a transaction involves an address or entity with a high risk of fraud, the computer system may provide a notification indicating this risk of fraud. Alternative or additionally, the computer system may pause the transaction before providing the notification. Further, the computer system may cancel the transaction. Even further, the computer system may notify government authorities regarding the transaction.

The address and entity risk models may be used to analyze massive data sets and predict fraud for an address and/or entity more accurately and quickly than a human mind is capable of. It would not be feasible for a human mind to analyze such data sets and derive relationships from the data to determine predictive outcomes. Accordingly, training and using the models can only be done using computing technology and would not be a mere mental process.

Further, the fraud predictions provided by the address and entity risk models can minimize the risk of fraud involved in transactions by informing entities where the transaction may involve high levels of risk. Accordingly, training and using the models includes the practical application of improving the safety of computer transactions by minimizing fraud.

II. Determining a Fraud Network

A fraud network may be a group of entities or addresses that may frequently or otherwise periodically engage in fraudulent activity. The computer system may build profiles of entities/addresses associated with fraud based on a likelihood of fraud associated with an address (e.g., based on a score generated by the address risk model). For example, where the address risk assigned to a first address used in an interaction is a high address risk (e.g., an address risk score above 75%), a first entity (or entities) involved in the interaction may be flagged as being fraud-associated. The computer system may then determine which other addresses and entities may be associated with this first entity/address. For example, the computer system may note which other entities may have used the first address and which other addresses the first entity may have used. The computer system may determine a fraud network profile by noting each entity/address that is associated with the first entity.

The fraud network profile may be further developed by investigating whether any of the entities/addresses associated with the first entity/address includes a high address or entity risk (i.e., to determine whether the fraud network/profile may be associated with fraud). Where those other associated entities/addresses are noted as being high risk, the computer system may incorporate those entities/addresses into the fraud network profile stemming from the first entity/address. Where associated entities/addresses are not high risk (e.g., they have an address/entity risk score below a certain threshold value), the computer system may maintain a record of these entities/addresses as a part of the fraud network profile but may label these entities/addresses as being a low risk within the fraud network profile (compared to the high risk entities/addresses being labeled as high risk within the fraud network).

The computer system may iteratively perform this step of determining other entities/addresses associated with entities/address in this fraud network until there are no more new entities/addresses associated with any entities/addresses in the fraud network. In other words, the step of determining other entities/addresses associated with the entities/addresses of the fraud network may be performed until all of the possible entities/addresses associated with the entities/addresses of the fraud network are identified. As noted above, the computer system may incorporate that an address is associated with a fraud network into the determination of the risk of fraud associated with the address in the address risk model.

When an interaction is submitted in real-time, application programming interface (API) calls can be made to cross-reference the information of the sending entity and the receiving entity of the interaction with the fraud network profile. In this manner, each entity/address in an interaction can be cross-referenced with the fraud network profile to determine whether to transmit a notification indicating that one or more of the entities or addresses involved in the interaction are in a fraud network.

Various other machine learning models (e.g., risk insights models and mule models) and associated attributes can be utilized to build a profile of the fraud network and any entities operating in direct connection or indirect connection with the fraud network (e.g., any entities having prior interactions with known/suspected fraudsters, PII shared by known/suspected fraudsters, and/or PII used by entities interacting with known/suspected fraudsters). Examples of such other machine learning models may include the fraud detection models and systems disclosed in U.S. patent application Ser. No. 17/824,688 by Burke et al., published as U.S. Patent Application Publication No. 2022/0383323 A1, entitled "FRAUD DETECTION SYSTEMS AND METHODS," the disclosure of which is incorporated herein in its entirety.

II. Providing Notifications

Embodiments of the present invention are additionally directed to techniques for generating various notifications relating to an interaction. A computer system can be used to generate and to transmit the various notifications to the sending entity and/or receiving entity of the interaction. The computer system may be, may include, or may be included in (e.g., implemented in software) a computer system (e.g., a computing device, a server device, a server farm of computing devices, etc.). The notifications can include push notifications (e.g., a proactive notification), text (SMS) message notifications, email notifications, web notifications, haptic notifications (e.g., a vibration), audio notifications (e.g., a ring or sound), and/or any other suitable type of notification. In some embodiments, the various notifications can include a fraud notification, a stale notification, and a safety notification. Other types of various notifications can be generated and transmitted by the computer system.

a. Fraud Notifications

A fraud notification may be provided to one or more entities involved in an interaction where the interaction may involve fraud. For example, once a particular address has been assigned an address risk score greater than a certain threshold value by the computer system, if that address is then used in a transaction, one or more of the entities (e.g., either sender or recipient) of that interaction may receive a fraud notification from the computer system that the interaction may run the risk of being fraudulent and/or the likelihood of fraud associated with the address. The threshold value may be set by a user according to their desired notification setting. For example, the threshold value may be greater than a certain percentage (e.g., greater than a 30% risk of fraud). Alternatively, the threshold value may be one of a low-, medium-, or high-risk of fraud based on the likelihood of fraud, as noted above. In this manner, the user may receive fraud notifications based on their desired risk level.

Additionally, the computer system may determine that the address/entity in an interaction may be a part of a fraud network based on a fraud network profile. Accordingly, the computer system may generate a fraud notification that may be provided to an initiating entity of the interaction, to a receiving entity of the interaction, or to a combination thereof that one or more of the entities/addresses involved in the interaction may be associated with fraudulent activity or within a fraudulent network. In some embodiments, the notification can include information indicating reasons the entity/address is associated with fraud or in a fraud network (e.g., detailing the connection, directly or indirectly, of the entity/address to fraud/a fraud network). Further, the notification may include information regarding the probability that the entity/address is associated with fraud or in a fraud network.

Although the fraud notification may be related to an address based on an address risk score, as discussed above, the fraud notification may additionally be related to an entity having an entity risk score greater than a certain threshold value. For example, if a transaction involves an entity having a history of fraud, the computer system may provide a fraud notification to one or more entities in the transaction. In some embodiments, entities can preselect desired levels of risk and/or desired types of transactions and/or desired types of transacting entities for which the entities may receive the fraud notifications (e.g., if the risk score is high or over 50%, if the transaction is with an unknown entity, or if the interaction is with a business the entity has never interacted with before, etc.). In some embodiments, the entity that is the cause of the potential risk (e.g., the entity associated with fraud based on the entity/address risk score or the entity within a fraud network) may be alerted (as part of the notification process) to the fact that the system has identified that entity as a possible/likely/known fraudster. This accused entity may then have the opportunity to appeal or review their status based on the reasoning provided in the fraud notification. In some embodiments, the notification can be transmitted (e.g., to the sending entity, to the receiving entity, or to a combination thereof) after the interaction is executed. This may allow a user to cancel a completed interaction.

In other embodiments, where the computer system determines that neither the entities nor the addresses are associated with fraud, the computer system may not provide any notification. In an alternative embodiment, the computer system may provide a notification that none of the entities/addresses in the interaction are involved with fraud (e.g., as a pop up or as a statement at some point in the transaction).

b. Stale Notification

Embodiments may include the computer system generating a stale notification relating to a stale interaction. The stale interaction may be or otherwise include an initiated interaction that has not yet been completed (or for which no progress has been made) within a predefined period, or a "grace period," (e.g., five minutes, 10 minutes, 15 minutes, one hour, etc.). This predefined period is the period of time for interacting entities to complete or progress the interaction before the interaction is labeled stale. The predefined period of time may be tolled, at first, from the initiation of the interaction and then after detecting a most recent user input, as discussed further below. The stale notification may inform or otherwise indicate to an entity trying to complete the interaction that the interaction is stale. The stale notification may provide an option to the entity for completing the stale interaction or for canceling the stale interaction. For example, an entity may initiate an interaction, which starts the toll for the grace period. The entity may lose connection, may forget to submit or finalize the interaction, or may otherwise not complete or interact with the interaction over the predefined period. In some embodiments, the stale notification may be overlaid over the screen displaying the interaction.

In some embodiments, the length of the grace period can be selected by one or more of the interacting entities (e.g., a predefined period of time, such as 5 minutes, 10 minutes, or the like). In other embodiments, the length of the grace period can be determined by an interaction type or type of interacting party (or interactions with certain types of interacting parties). For example, the interaction may include more complex questions, that may necessitate a longer grace period. For example, the grace period may be dependent on the number of inputs required to complete the interaction (e.g., a shorter grace period for an interaction requiring only 10 keystrokes, rather than 20 keystrokes). In another example, the grace period may be dependent on the variety of inputs required to complete the transaction (e.g., a longer grace period for an interaction requiring numeral inputs, letter inputs, and special character inputs (such as a tilde, exclamation mark or the like) rather than just one of numeral inputs, letter inputs, or special character inputs). Further, where the interaction involves money, the grace period may correspond with the amount of money involved as a user may require more time to carefully consider the interaction where more money is at stake. For example, the larger the amount of money, the longer the grace period to allow for an entity greater time to review the interaction before completion (e.g., a grace period of 10 minutes for transactions involving less than $1,000, 15 min for transactions between $1,000 and $10,000, 20 min for transactions between $10,000 and $50,000, or the like).

The grace period may reset depending on when a last user input was detected. For example, the grace period may reset after the computer system detects user inputs after a first period of time less than the grace period from the initiation of the interaction. Then, when the computer system does not detect a further user input for a second period of time longer than the grace period, the computer system may then transmit the stale notification to the entity.

Subsequent to the expiration of the grace period, the entity may be provided a stale notification. In some embodiments, the stale notification can include information about what caused the interaction to become stale. For example, this may include a failure to finish all the required entries (e.g., name, address, telephone, or the like) in completing the transaction. Further, this may include not inputting all the entries correctly (e.g., not having the requisite amount of numbers on an entry for credit card information). In this example, the computer system may indicate which entries have not been completed or were completed incorrectly by highlighting or the like to allow for the entity to correctly input those entries for the transaction. In other embodiments, stale notification can include additional information (date/time/transacting parties/purpose of transaction/etc.) depending on what is in the entry field for the interaction. In some embodiments, the entity can receive stale notifications for certain interaction types (e.g., whether the interaction is a transaction involving money) and/or for interactions with certain types of interacting entities (e.g., whether the interaction is between financial institutions or the like). For example, there may be no stale notification where the interaction does not involve money (or does not involve financial institutions) and is simply to register an account with a website. In some embodiments, the entity may choose when to receive the stale notification, including what type of notification and what information to be displayed in the notification. In some embodiments, the interaction may experience a completion fail and may not be able to reinitiate the interaction without a further interaction from the entity (e.g., confirming that the user is still present to continue and/or complete the interaction).

In some embodiments, once the stale notification has been sent, an additional timer may be initiated. For example, upon sending the stale notification, the entity may be provided with a preset amount of additional time (e.g., five minutes, 10 minutes, 15 minutes, one hour, etc.) in which to continue and/or complete the transaction. This additional time may be based on the complexity and money involved in the interaction (e.g., may be longer), as discussed above. Upon expiration of the additional timer, a new stale notification may be sent and/or the interaction may time out and be terminated and/or otherwise canceled. The stale notification may prevent an initiating entity from leaving the interaction open indefinitely, thus leaving the interaction open for an outside entity that did not initiate the interaction to steal the initiating entity's personal/financial information or potentially stealing the initiating entity's money via the interaction (e.g., where the interaction is a bank transaction).

c. Safety Notifications

Embodiments may include the computer system generating a safety notification relating to the safety of an entity at a based on event data related to a location of an entity. For example, the entity may have recently been associated with an interaction that included geolocation data (e.g., recently been involved in or initiated an interaction). Accordingly, the entity may determine a location of the entity after receiving information regarding the interaction. For example, this may include location information entered in an interaction. However, in other embodiments, the location of the entity may be based on a detected location of the user device associated with the entity. Cellphone data can be used to estimate the geolocation of a device at the time of using the device (e.g., communicating with cell towers). For example, wireless networks (including cellular networks) can transmit and receive signals in various directions, with different ranges, in various locations. The computer system can receive data from the wireless and cellular networks that includes latitude/longitude information of the devices used to initiate interactions. In other embodiments, the computer system may receive data regarding the location of a cell tower in the wireless network and determine which cell tower is closest to the entity based on which tower the entity is connected to. Alternatively or additionally, the geolocation of the user device may be provided by the device. For example, the user may consent to allow the geolocation of the user device to be provided to the computer system as a latitude/longitude information, GPS data, or other geolocation data. This data may be provided any time or only when the user device is using a phone application, depending on what the user consents to. The geolocation data can be stored by the computer system in a readily accessible database.

In a yet further alternative, the user location may be a radius approximating the location of the user device rather than a specific location of the user device. For example, the user location may be a radius of 1 mile from the last known location of the user device. This may account for a lag between receiving the specific locations of the user device. This radius may change according to how much time has elapsed since the last known location of the user device (e.g., 1 mile for 1 hour, 2 miles for 2 hours, or the like). Accordingly, a distance from the user location may indicate a distance from an outer circumference of the radius of the last known location of the user device.

The event data may include data related to a crime, traffic, major event, emergency (e.g., hurricane, tornado, etc.), weather, or the like. Although the below methods is directed to crime data, it is understood that the below methods may be directed to any of the above-listed events. The crime data can include a location of the crime (e.g., a specific location or a radius from the reported location of the crime), a time of the crime, and/or the type of crime, or any combination or subset thereof. The type of the crime can include violent crimes (e.g., shootings, robberies, kidnapping, etc.), non-violent crimes (e.g., financial, white collar, embezzlement, insider trading, tax evasion, etc.), and/or other types of crimes. The type of the crime can also include a severity of the crime (e.g., the magnitude of people affected by the crime). For example, a mugging involving one person is less severe than a mugging involving two people.

The crime data may be received from a public crime database. The public crime data can be accessed (e.g., from any available data sources such as the police and other government agencies, from news agencies/outlets, from social media, and/or from vendors, etc.). The crime data may be provided to the computer system in real-time or at a certain frequency (e.g., every 5 minutes, 1 hour, 1 day, or the like).

Based on the geolocation of the crime data, the geolocation data of the device can be cross-referenced with the criminal activity to identify entities that are performing (or have recently performed) interactions within an estimated distance of the criminal activity.

Push notifications (or other suitable notifications) can be provided to the entities for alerting users of nearby criminal activity. In some embodiments, text mining and/or other methods can be used to estimate any missing data (e.g., location of the entity or the crime, time of the interaction or the crime, crime type or severity, or the like).

The computer system can use the location data of the interaction and the crime to perform a comparison between the location data to crime data within a predetermined location radius and time period according to the location and time of the interaction. The computer system may generate a safety notification including safety information of a particular geographic location (e.g., nearby crimes, types of crime, location from the crimes, description of the persons/vehicles involved, whether the persons are armed, how many were hurt or killed (if any), recommended safety precautions (e.g., what actions to take, where to go, etc.), elapsed time since the crime, or the like) based on the comparison between the geolocation data and the crime data.

Entities may receive safety notifications/alerts based on predetermined settings regarding the types of crimes and/or location from those crimes. The entity may alter the settings as desired, however, in alternative embodiments, the computer system may also alter the settings. As such, entities can receive safety notifications if the entities are located in the area of the crime (e.g., the entity is associated with a physical address in the area, or a device of the entity shows the entity is or was recently located in the area) or if the entities have previously (or currently) interacted in the area. The safety notification may be provided when the distance from the crime to the entity is less than a certain threshold value. For example, entities can elect to receive notifications for a mugging if a mugging was within 2 miles, or other predetermined distance, of the geolocation of the entity. Alternatively or additionally, the entities can elect to receive notifications if the crime was within a predetermined distance of the location of their home or work address. In a yet further alternative, the entity may receive notifications where the location of the entity's user device is within a range or radius of the reported location of the crime (e.g., within 2 miles, 50 miles, 100 miles). In this example, there may be no need to determine a distance between the location of the crime and the user device.

The safety notification may additionally be provided based on the severity/type of crime (e.g., the more violent the crime, the less the threshold value is). For example, the computer system may provide a safety notification for a mass shooting if the mass shooting was within 50 miles of the geolocation of the entity even though the computer system may not provide a safety notification if a mugging was 5 miles from the entity. As such, the safety notification may be generated based on a selected size of the area, the type of crime, and/or the severity of crime for transmitting the safety notifications. The entity may configure the safety notification to be transmitted by changing each of these factors according to a desired setting by the entity. In a yet further embodiment, the entity can determine the minimum number of interactions in the area before receiving a safety notification (e.g., at least once, two or more times, and/or routine interactions, etc.).

In a yet further embodiment, the safety notification may be transmitted only if the interaction happened within a certain period of time (e.g., the crime window) before the crime data indicating a time of the crime is received by the computer system. For example, if an interaction included buying a cell phone from a phone store occurred five months ago and the computer system receives crime data indicating that a mugging has recently occurred near the store, the computer system may not transmit the safety notification as the period of time between the interaction and the crime has been too long. Alternatively, the crime window may be the period of time between a time when determining the last known location of the user device and a time of the crime.

The crime window may be based on the type/severity of crime (e.g., the more violent/severe the crime, the longer the time period of the crime window). Continuing with the previous example, the computer system may receive crime data indicating that a mass shooting has recently occurred near the store. The computer system may transmit the safety notification to the entity regarding the mass shooting as the crime window for a mass shooting may be longer than five months (e.g., six months, seven months, eight months, or the like).

Further, the crime window may be based on a type of interaction in an area. For example, where the interaction involved a purchase of a house, the crime window for the area the house is in may be a long time (e.g., many years) as the purchase of a house may indicate that an entity may be near the house (e.g., living in the house or knowing someone that lives in the house). Other such interactions may include opening a bank account, paying a security deposit for a lease, or the like. On the other hand, where the interaction involved purchasing gas from a gas station, the crime window for that area may be short (e.g., a week) as such an interaction may not indicate that the entity is near the area. Accordingly, the types of interactions may affect the length of the crime window as the type of interaction may indicate an entity's intent to reside in an area.

In another embodiment, the crime window may be based on a pattern and/or frequency of the type of interactions in an area. For example, where an entity purchases gas from a gas station (or gas stations near a given area) regularly (e.g., once every two weeks, once a month, or the like), the crime window may be longer (e.g., six months) as such a regular purchase of gas may indicate that the entity frequents this area often. Other such interactions may include regular purchases of groceries, coffee, having a gym subscription, or the like. On the other hand, where an entity purchases a snack from a convenience store once but is not involved in any other interaction in the area since that purchase, the crime window may be short (e.g., a week) as this singular interaction in the area may not indicate the entity frequents this area. Accordingly, the pattern and/or frequency of interactions may indicate that an entity frequents an area which, in turn, may affect the length of the crime window.

In a yet further embodiment, the crime data may include multiple crime reports having a crime type(s) relevant to particular user based on the user's notification settings. For example, there may be multiple muggings in an area. The computer system may notify the user device of each mugging that is within a predetermined distance to the user device. Alternatively, the computer system may notify the user device of both muggings based on a mean value of the coordinates (e.g., of latitude and longitude) between the muggings and the coordinate of the user device.

III. Flowchart for Determining and Using Address Risk Score

Figure 1:
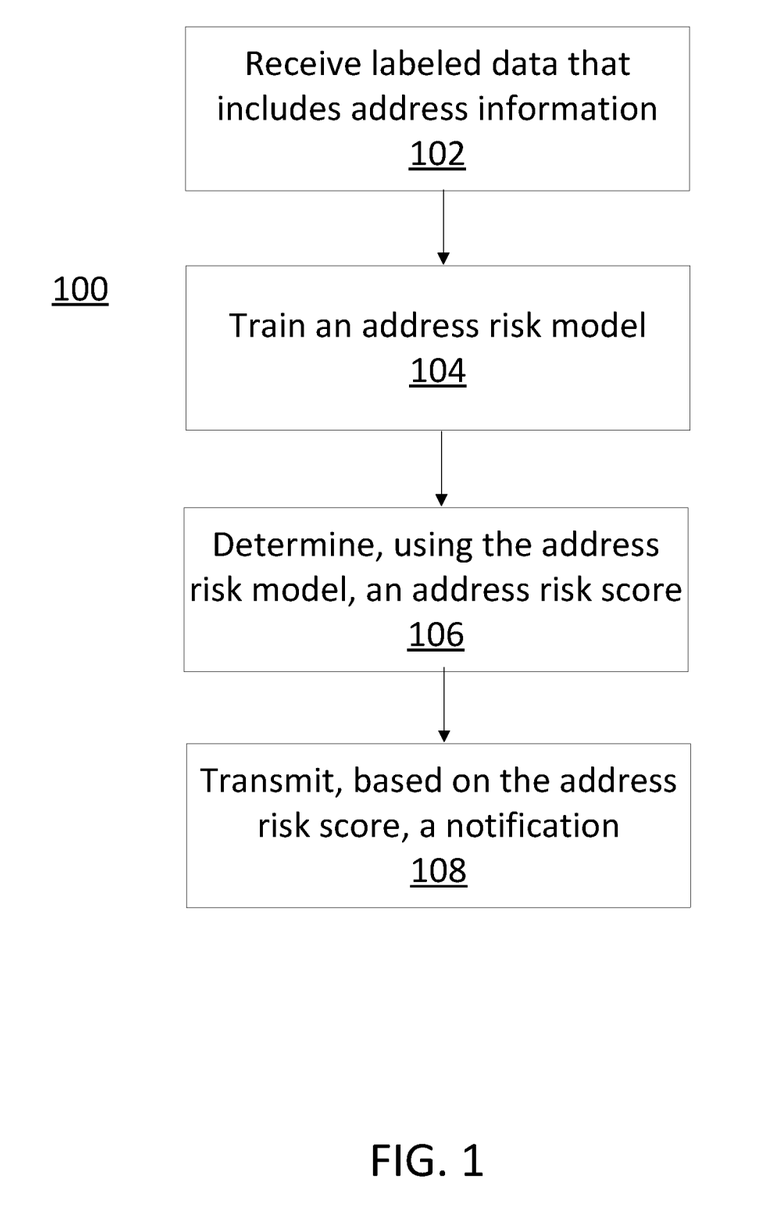
FIG. 1 is a flowchart illustrating a process for training an address risk model according to an embodiment of the present invention.

FIG. 1 is a flowchart illustrating one embodiment of a process 100 to train an address risk model in accordance with the present invention. The process 100 begins at operation 102, where a computer system may receive labeled data that includes address information for one or more addresses and labels corresponding to the one or more addresses. The labeled data may be labeled address data that includes address information (e.g., physical addresses such as a residential address, a business address, a P.O. Box, etc.). The labeled data can include a set of addresses, a set of entities associated with the addresses, and/or a set of labels that may correspond to the addresses and/or the entities, as described above. The labeled data may additionally include flagged behavior, non-fraudulent behavior, and fraudulent behavior related to an address.

At operation 104, the computer system may train an address risk model capable of predicting a risk of fraud for an address by determining relationships among the labeled data. This may include deriving relationships between one or more of the flagged behavior, non-fraudulent behavior, and fraudulent behavior. The computer system may derive weighted values for each type of behavior based on the presence of each type of behavior and number of instances of each type of behavior for a given address. The address risk model may be an algorithm that includes the weighted values for each type of behavior for each instance of each type of behavior, as noted above.

At operation 106, the computer system may determine, using the address risk model, an address risk score of a first address of the one or more addresses based on the labeled data of the first address. For example, the computer system may receive a request for an address risk score for a particular address. In response, the computer system may request and receive labeled data for a particular address and input that labeled data into the address risk model. The address risk model may output an address risk score (quantitative or qualitative) and assign the value to the address. In some embodiments, the address risk model may determine that an address is periodically associated with fraudulent activity or with entities that are associated with fraudulent activity. Accordingly, the address risk model may generate or otherwise determine the address risk score based on the association between the address and fraudulent activity.

At operation 108, the computer system may optionally transmit, based on the address risk score being greater than a threshold value, a notification to an entity involved in an interaction with the first address device regarding a likelihood of fraud of the first address. For example, where the address risk score is greater than a threshold value of 25%, the computer system may transmit a notification as described. Where the address risk score is less than the threshold value, the computer system may not transmit a notification and may end the process 100.

IV. Flowchart for Determining a Fraud Network

Figure 2:
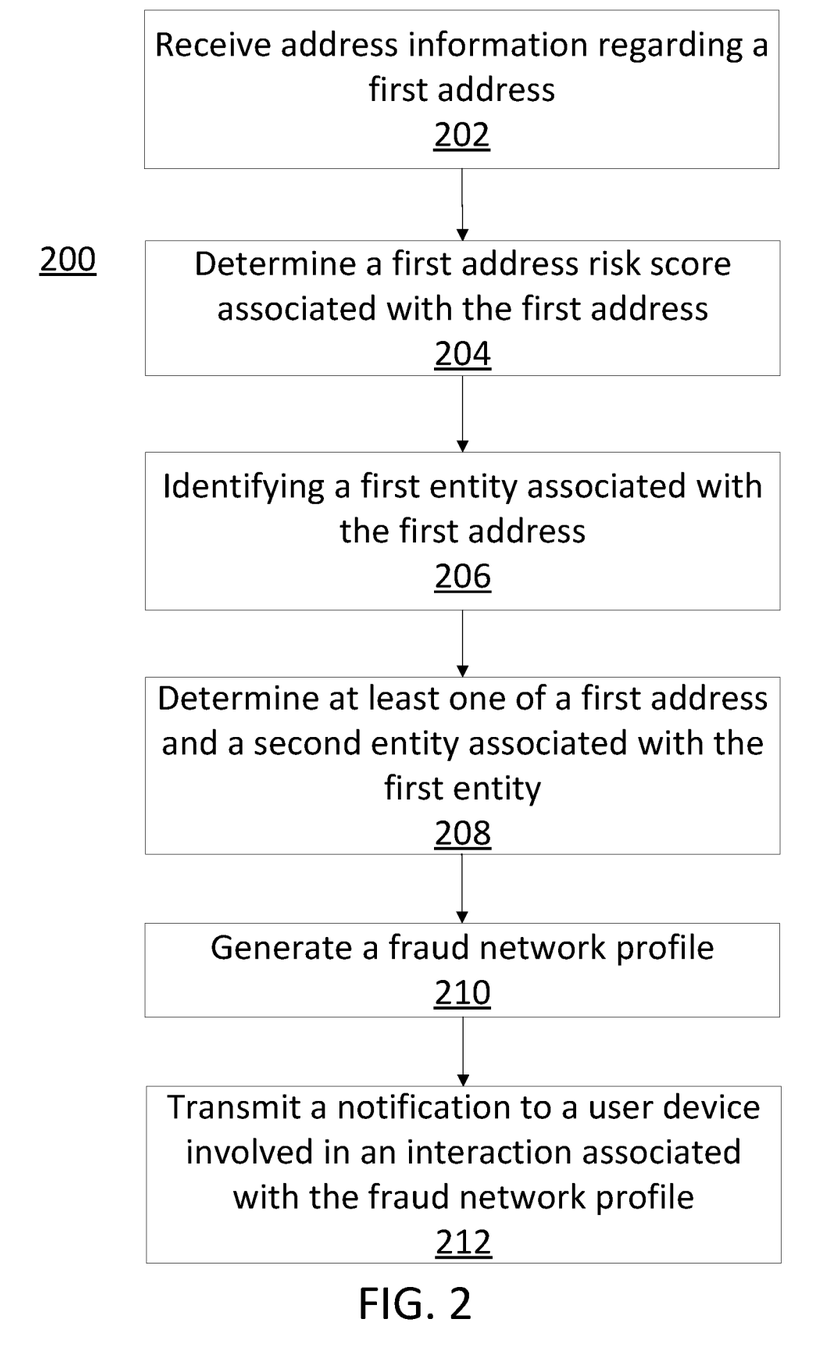
FIG. 2 is a flowchart illustrating a process for generating a fraud network profile according to an embodiment of the present invention.

FIG. 2 is a flowchart illustrating one embodiment of a process 200 for determining a fraud network in accordance with the present invention. The process 200 begins at operation 202, where a computer system may receive address information regarding a first address. The address information may be included in information about an interaction involving an entity (e.g., initiated by the entity by a user device). The initiated interaction may cause interaction information to be generated and transmitted to the computer system. The computer system may receive data from a fraud database including information relating to existing fraud networks or other entities that have been involved in, or that have been suspected to be involved in, fraudulent activity. For example, this may include entities that have been assigned a high entity risk score and/or address that have been assigned a high address risk score. In some embodiments, the computer system may make an API call, in response to receiving the interaction data, to the fraud database to retrieve the fraud data.

At operation 204, the computer system may determine, using an address risk model, a first address risk score associated with the first address. The computer system may store this first address risk score to be associated with the first address.

At operation 206, the computer system may identify a first entity associated with the first address based on the first address risk score. For example, the computer system may identify the first entity based on whether the first entity has an address risk score at all. Alternatively, where the address risk score is greater than a threshold value of 25%, the computer system may identify a first entity associated with the first address. Where the address risk score is less than the threshold value, the computer system may end the process 200.

At operation 208, the computer system may determine at least one of a second address and a second entity associated with the first entity. This second address/entity may be other addresses/entities associated with the first entity in a fraud network.

At operation 210, the computer system may generate a fraud network profile including the first address, and the at least one of the second address and second entity. In particular, the computer system may create a profile noting the addresses/entities as being within the same fraud network.

At operation 212, the computer system may transmit a notification to a user device involved in an interaction with at least one of an entity or address of the fraud network profile. The computer system can generate a fraud notification and transmit the fraud notification to the user device for display to the initiating entity, to the receiving entity, or to a combination thereof. The fraud notification can include a push notification, a text message (SMS) notification, an email notification, or other suitable type of notification. The fraud notification may inform the initiating entity or the receiving entity that the interaction may associated with fraudulent activity, and the fraud notification may provide an option to terminate or otherwise not finish the interaction. In some embodiments, the computer system may transmit the fraud notification to an entity suspected of being associated with fraudulent activity, and, accordingly, the fraud notification may deter at least some fraudulent activity.

V. Flowchart for Transmitting a Stale Notification

Figure 3:
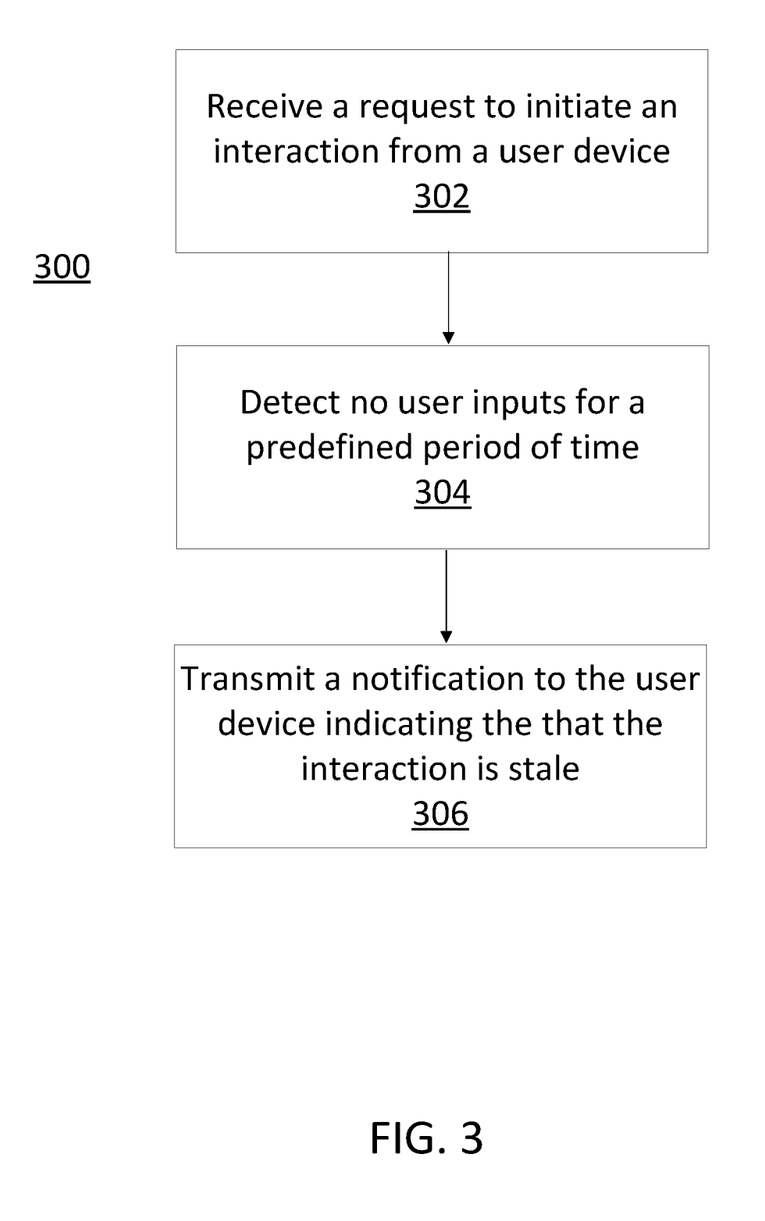
FIG. 3 is a flowchart illustrating a process for generating a stale notification according to an embodiment of the present invention.

FIG. 3 is a flowchart illustrating one embodiment of a process 300 for transmitting a stale notification in accordance with the present invention. The process 300 begins at operation 302 by the computer system receiving data about an interaction involving a user device, the data including a predefined period of time (i.e., a grace period) based on a complexity of the interaction. An entity may initiate the interaction, and the interaction may cause interaction data to be generated (e.g., by the user device or other suitable computing device). The user device may transmit the interaction data to the computer system. In some embodiments, the interaction data can include a time/date of the interaction, such as a configurable grace period, and other suitable interaction information. The grace period can be adjusted by the entity, by the computer system, or other suitable computing device or model. The complexity of the interaction may include a number of user inputs required to complete the interaction, a variety of user inputs required to complete the interaction, and where the interaction involves money, the predefined period of time is additionally based on an amount of money involved in the interaction. In some embodiments, the grace period can indicate an amount of time that may elapse before considering the interaction to be a stale interaction.

At operation 304, the computer system 302 may detect no user inputs for the predefined period of time. For example, the computer system may determine that the interaction is stale by determining that no user inputs have been received since the last received user input. If the computer system determines that the interaction is stale, the computer system may proceed to operation 306. If the computer system determines that the interaction is not stale, the computer system may take no further action or may repeat the operations 302 and 304 until the computer system determines that an interaction is stale or the interaction is complete (e.g., the transaction has concluded).

At the operation 306, the computer system may transmit a notification to the user device indicating that the interaction is stale. The notification can include a push/proactive notification, a text message (SMS) notification, an email notification, or other suitable type of notification. In response to determining the interaction is stale, the computer system may generate and/or transmit the stale notification to the user device. The stale notification may include a selectable option for allowing the entity to continue and/or complete the interaction. The stale notification can include other suitable information or options for the entity to select. In some embodiments, the initiated interaction may automatically terminate after a predetermined and/or configurable amount of time elapses subsequent to initiating the interaction or to determining that the interaction is stale.

VI. Flowchart for Transmitting a Safety Notification

Figure 4:
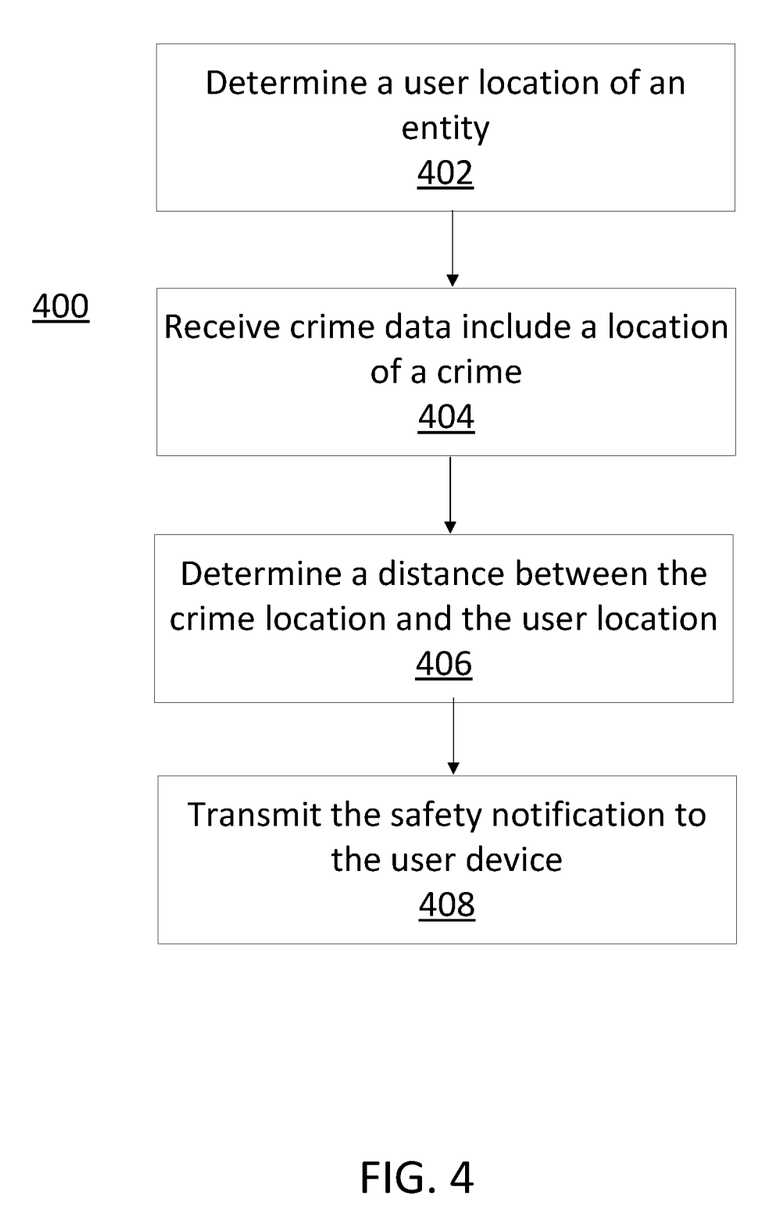
FIG. 4 is a flowchart illustrating a process for generating a safety notification according to an embodiment of the present invention.

FIG. 4 is a flowchart illustrating one embodiment of a process 400 for transmitting a safety notification in accordance with the present invention. The process 400 begins at operation 402 by the computer system determining a user location of an entity. The geolocation information may indicate an approximate location of the entity, for example, during initiation of the interaction or at other suitable points in time. This may include determining the user location of a user device or based on an interaction involving an entity associated with the user device (e.g., address information filled in during the interaction or the location of the user device during the interaction). For example, the entity may initiate the interaction via a user device and the user device may generate the geolocation data and transmit the geolocation data to the computer system. Alternatively or additionally, the geolocation data may additionally or alternatively be periodically generated by the user device and transmitted to the computer system (e.g., through cellular data of the user device).

At operation 404, the computer system may receive crime data including a crime location of a crime. The computer system may access one or more public databases (e.g., the public database 701) such as a police records database, social media feeds, and/or other suitable publicly accessible databases to receive this crime data. The safety data may include data about criminal activity such as a type of crime, a location of crime, a severity of crime, and/or other suitable information relating to the criminal activity.

At operation 406, the computer system may determine a range from the crime location. For example, the computer system can determine that the entity, based on the geolocation data, is within a predetermined distance (i.e., a threshold value) from a crime. Alternatively, the computer system may determine a radius from the location of the crime. The type of the crime, the predetermined distance, the severity of the crime, and/or other information relating to the crime can be adjusted by the entity or the computer system for the comparison. If the computer system determines that the entity is within the predetermined distance, the computer system may proceed to operation 408. If the computer system determines that the entity is not within the predetermined distance of the crime, the computer system may take no further action with respect to the received safety data and geolocation data. In some embodiments, the computer system may additionally determine whether the period of time between the crime and the time the last known location of the user device (or the time of the interaction) is greater than a predefined period of time (i.e., a crime window).

At the operation 408, where the user location is within the range, the computer system may transmit the safety notification to the user device regarding the crime. The safety notification can include a push/proactive notification, a text message (SMS) notification, an email notification, and/or other suitable type of notification. The computer system may generate and transmit the safety notification for display on the user device for informing the entity of the criminal activity. The safety notification may include various information relating to the criminal activity. For example, the safety notification can include a type of the crime, a location of the crime, a severity of the crime, recommended precautionary actions for the entity to take, and/or other suitable information relating to the criminal activity. In some embodiments, the computer system may transmit the generated safety notification to each user device within the predetermined distance from the criminal activity.

VII. Computer System for Implementing the Embodiments Described Herein

Figure 5:
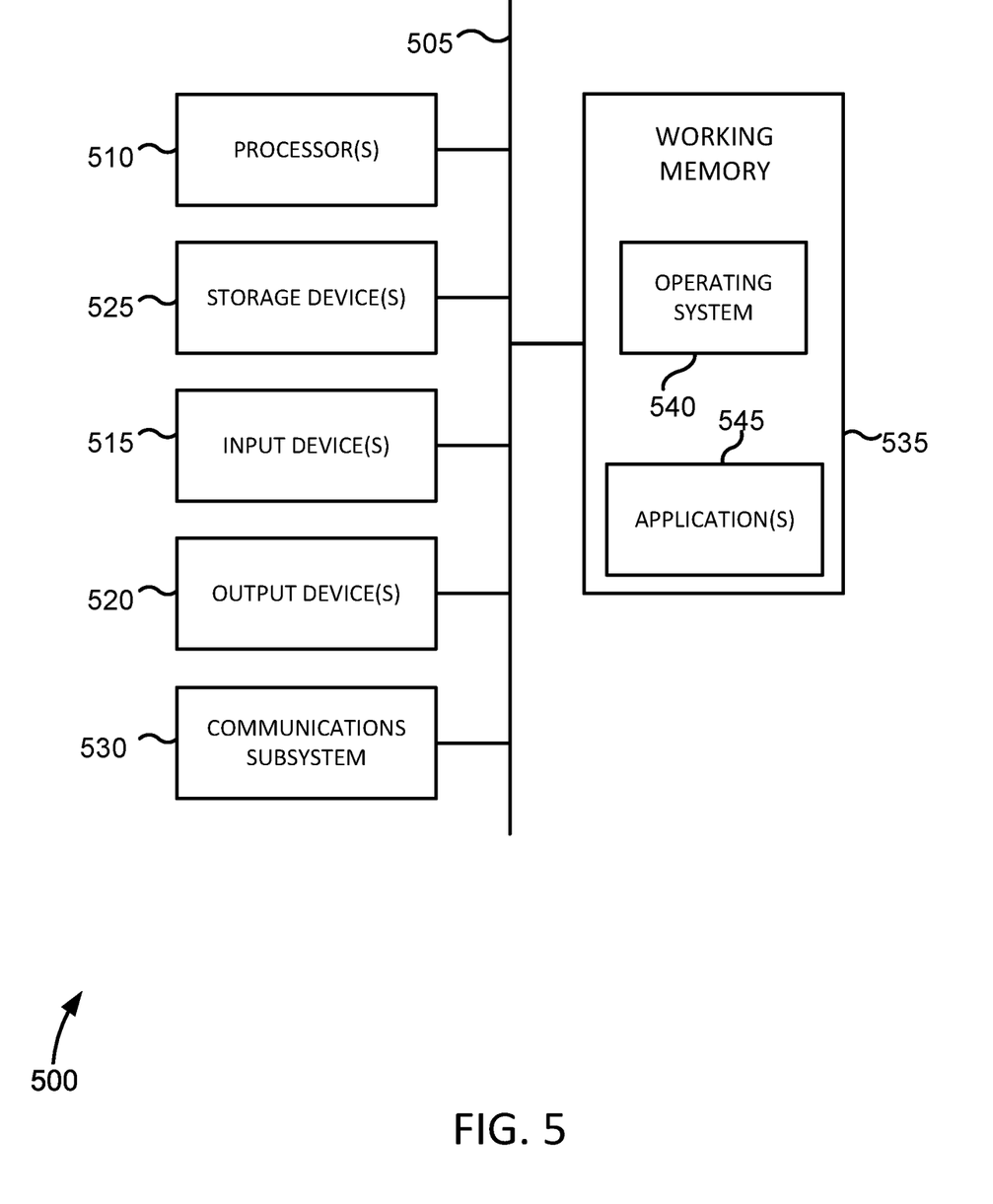
FIG. 5 is a block diagram of a computer system according to an embodiment of the present invention.

A computer system as illustrated in FIG. 5 may be incorporated as part of the previously described computerized devices. For example, computer system 500 can represent some of the components of computer systems, and/or other computing devices described herein. FIG. 5 provides a schematic illustration of one embodiment of a computer system 500 that can perform the methods provided by various embodiments, as described herein. FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit 510, including without limitation one or more processors, such as one or more central processing units (CPUs), graphical processing units (GPUs), special-purpose processors (such as digital signal processing chips, graphics acceleration processors, and/or the like); one or more input devices 515, which can include without limitation a keyboard, a touchscreen, receiver, a motion sensor, a camera, a smartcard reader, a contactless media reader, and/or the like; and one or more output devices 520, which can include without limitation a display device, a speaker, a printer, a writing module, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 530 may permit data to be exchanged with a network (such as a network of computer devices), other computer systems, and/or any other devices described herein. In many embodiments, the computer system 500 will further comprise a non-transitory working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a system configured to provide some or all of the features described herein can comprise hardware and/or software that is specialized (e.g., an application-specific integrated circuit (ASIC), a software method, etc.) or generic (e.g., processing unit 510, applications 55, etc.) Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire, and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processing unit 510.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of determining a fraud network using one or more processors comprising:
   receiving labeled data including address information corresponding to a first address;
   determining, using an address risk machine learning model, a first address risk score associated with the first address;
   identifying a first entity associated with the first address based on the first address risk score being greater than a threshold value;
   determining at least one of a second address or a second entity associated with the first entity;
   generating a fraud network profile including the first address, and the at least one of the second address or second entity; and
   transmitting a notification to user device associated with the generated fraud network profile.

2. The method of claim 1, wherein transmitting the notification occurs when the user device is involved in an interaction with at least one of an entity or address of the fraud network profile.

3. The method of claim 1, wherein identifying the first entity is based on the first address risk score being greater than the threshold value.

4. The method of claim 3,
   wherein determining at least one of the second address or second entity comprises determining the second address is associated with the first entity;
   the method further comprises determining, using the address risk machine learning model, a second address risk score associated with the second address; and
   wherein generating the fraud network profile comprises incorporating the second address based on the second address risk score being greater than the threshold value.

5. The method of claim 3, further comprising:
   iteratively identifying further entities or addresses associated with the at least one of the entity or address of the fraud network profile; and
   incorporating the further entities or addresses into the fraud network profile.

6. The method of claim 5, wherein iteratively identifying the further entities or addresses comprises iteratively identifying the further entities or addresses until there are no more unidentified entities or addresses associated with the at least one of the entity or address of the fraud network profile.

7. The method of claim 5, wherein:
   iteratively identifying further entities or addresses comprises identifying further addresses associated with the at least one of the entity or address of the fraud network profile; and
   incorporating the further addresses into the fraud network profile is based on a corresponding address risk score of the further addresses being greater than the threshold value.

8. The method of claim 1,
   the method further comprises determining, using an entity risk machine learning model, an entity score of the second entity greater than an entity risk score; and
   wherein generating the fraud network comprises generating the fraud network to include the second entity.

9. The method of claim 1, further comprising training the address risk machine learning model capable of predicting a risk of fraud for an address by determining relationships among the labeled data.

10. A system for determining a fraud network, comprising:
    one or more processors; and
    a memory having stored thereon instructions that, upon execution by the one or more processors, cause the one or more processors to:
    receiving labeled data including address information corresponding to a first address;
    determining, using an address risk machine learning model, a first address risk score associated with the first address;
    identifying a first entity associated with the first address based on the first address risk score being greater than a threshold value;
    determining at least one of a second address or a second entity associated with the first entity;
    generating a fraud network profile including the first address, and the at least one of the second address or second entity; and
    transmitting a notification to user device associated with the generated fraud network profile.

11. The system of claim 10, wherein identifying the first entity is based on the first address risk score being greater than the threshold value.

12. The system of claim 11,
    wherein determining at least one of the second address and second entity comprises determining the second address is associated with the first entity;
    the instruction further comprises determining, using the address risk machine learning model, a second address risk score associated with the second address; and
    wherein generating the fraud network profile comprises incorporating the second address based on the second address risk score being greater than the threshold value.

13. The system of claim 11, further comprising:
    iteratively identifying further entities or addresses associated with the at least one of the entity or address of the fraud network profile; and
    incorporating the further entities or addresses into the fraud network profile.

14. The system of claim 13, wherein iteratively identifying the further entities or addresses comprises iteratively identifying the further entities or addresses until there are no more unidentified entities or addresses associated with the at least one of the entity or address of the fraud network profile.

15. The system of claim 13, wherein:
    iteratively identifying further entities or addresses comprises identifying further addresses associated with the at least one of the entity or address of the fraud network profile; and incorporating the further addresses into the fraud network profile is based on a corresponding address risk score of the further addresses being greater than the threshold value.

16. The system of claim 10, further comprising training the address risk machine learning model capable of predicting a risk of fraud for an address by determining relationships among the labeled data.

17. A non-transitory computing-device readable storage medium on which computing-device readable instructions of a program are stored, the instructions, when executed by one or more computing devices, causing the one or more computing devices to perform a method, comprising:
   receiving labeled data including address information corresponding to a first address;
   determining, using an address risk machine learning model, a first address risk score associated with the first address;
   identifying a first entity associated with the first address based on the first address risk score being greater than a threshold value;
   determining at least one of a second address or a second entity associated with the first entity;
   generating a fraud network profile including the first address, and the at least one of the second address or second entity; and
   transmitting a notification to user device associated with the generated fraud network profile.

18. The non-transitory computing-device readable storage medium of claim 17, wherein transmitting the notification occurs when the user device is involved in an interaction with at least one of an entity or address of the fraud network profile.

19. The non-transitory computing-device readable storage medium of claim 17,
   the method further comprises determining, using an entity risk machine learning model, an entity score of the second entity greater than an entity risk score; and
   wherein generating the fraud network comprises generating the fraud network to include the second entity.

20. The non-transitory computing-device readable storage medium of claim 17, further comprising training the address risk machine learning model capable of predicting a risk of fraud for an address by determining relationships among the labeled data.

* * * * *